United States Patent [19]
Uematsu

[11] Patent Number: 6,009,262
[45] Date of Patent: Dec. 28, 1999

[54] PARALLEL COMPUTER SYSTEM AND METHOD OF COMMUNICATION BETWEEN THE PROCESSORS OF THE PARALLEL COMPUTER SYSTEM

[75] Inventor: Mikio Uematsu, Yokohama, Japan

[73] Assignee: Kabushiki Kaisha Toshiba, Kawasaki, Japan

[21] Appl. No.: 08/852,441

[22] Filed: May 7, 1997

[30] Foreign Application Priority Data

May 10, 1996 [JP] Japan .................................. 8-139760

[51] Int. Cl.$^6$ ...................................................... G06F 9/44
[52] U.S. Cl. ............................... 395/500.48; 395/500.42; 395/706; 395/708; 712/18; 712/32
[58] Field of Search ............................... 395/500, 800.01, 395/800.16, 800.11, 800.21, 800.28, 500.27, 500.48, 706, 708, 500.42; 712/17, 18, 32

[56] References Cited

U.S. PATENT DOCUMENTS

| | | | |
|---|---|---|---|
| 4,084,228 | 4/1978 | Dufond et al. | 364/200 |
| 5,414,849 | 5/1995 | Yamamoto | 395/650 |
| 5,649,198 | 7/1997 | Shibata et al. | 395/670 |
| 5,721,928 | 2/1998 | Umehara et al. | 395/706 |
| 5,740,463 | 4/1998 | Oshima et al. | 395/800.11 |
| 5,778,224 | 7/1998 | Tobe et al. | 395/670 |

FOREIGN PATENT DOCUMENTS

| | | |
|---|---|---|
| 7-93265 | 4/1995 | Japan . |
| 8-190534 | 7/1996 | Japan . |

*Primary Examiner*—Kevin J. Teska
*Assistant Examiner*—Thai Phan
*Attorney, Agent, or Firm*—Foley & Lardner

[57] ABSTRACT

A parallel computer system which divides the entire space of facilities into a plurality of small divisions; assigns a plurality of processors thereof to the divisions, respectively, the lower stream processors receiving data on a boundary condition from the upper stream processor by communication to determine a condition for the continuity of the adjacent divisions, the processors carrying out parallel analytical operations for the analysis of the data on the corresponding divisions so as to meet the received boundary condition; and collects data obtained by the parallel analytical operations of the processors in a host computer to obtain analytical data on the large-scale facilities. The lower stream processors assigned to the lower stream divisions receive boundary conditions provided by the upper stream processors assigned to the upper stream divisions in order starting from the lowermost stream processor assigned to the lowermost steam division upward, and the processor to receive data gives a data transmission request signal to the processor to transmit data, and the latter processor transmits data to the former processor after receiving the data transmission request signal given thereto by the former processor.

10 Claims, 6 Drawing Sheets

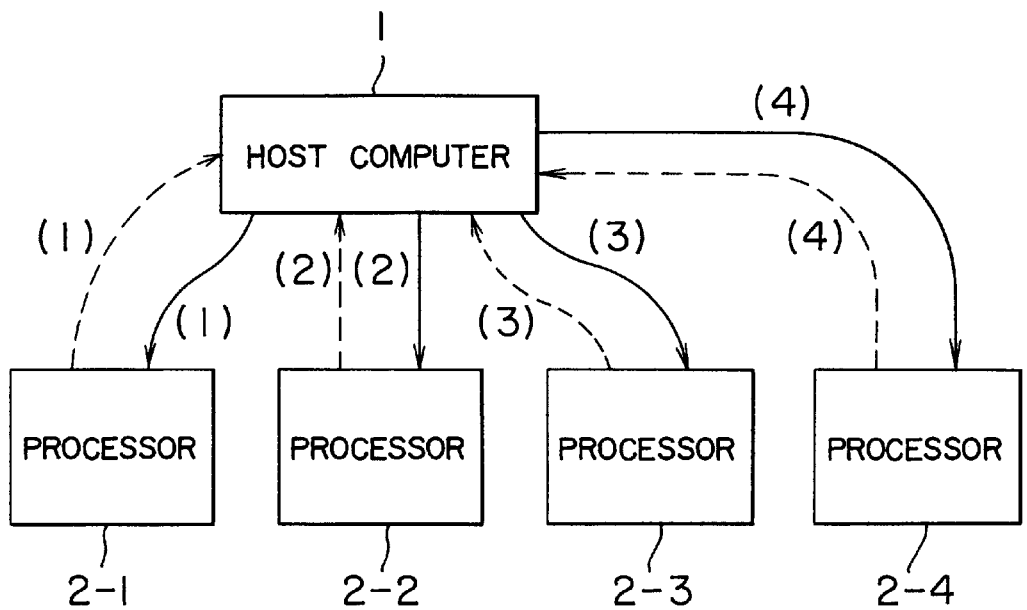
F I G. 3
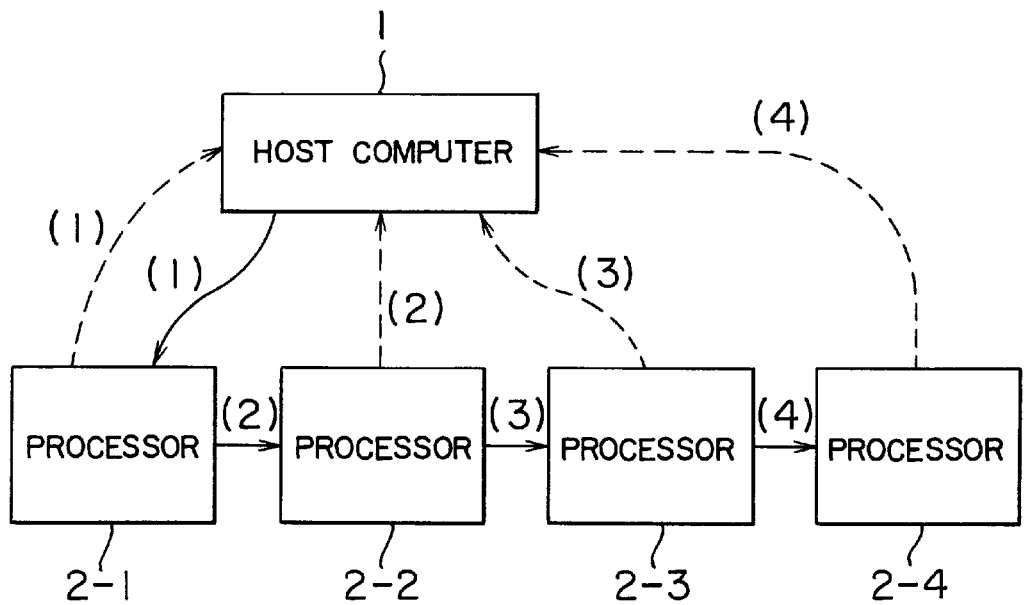
F I G. 4

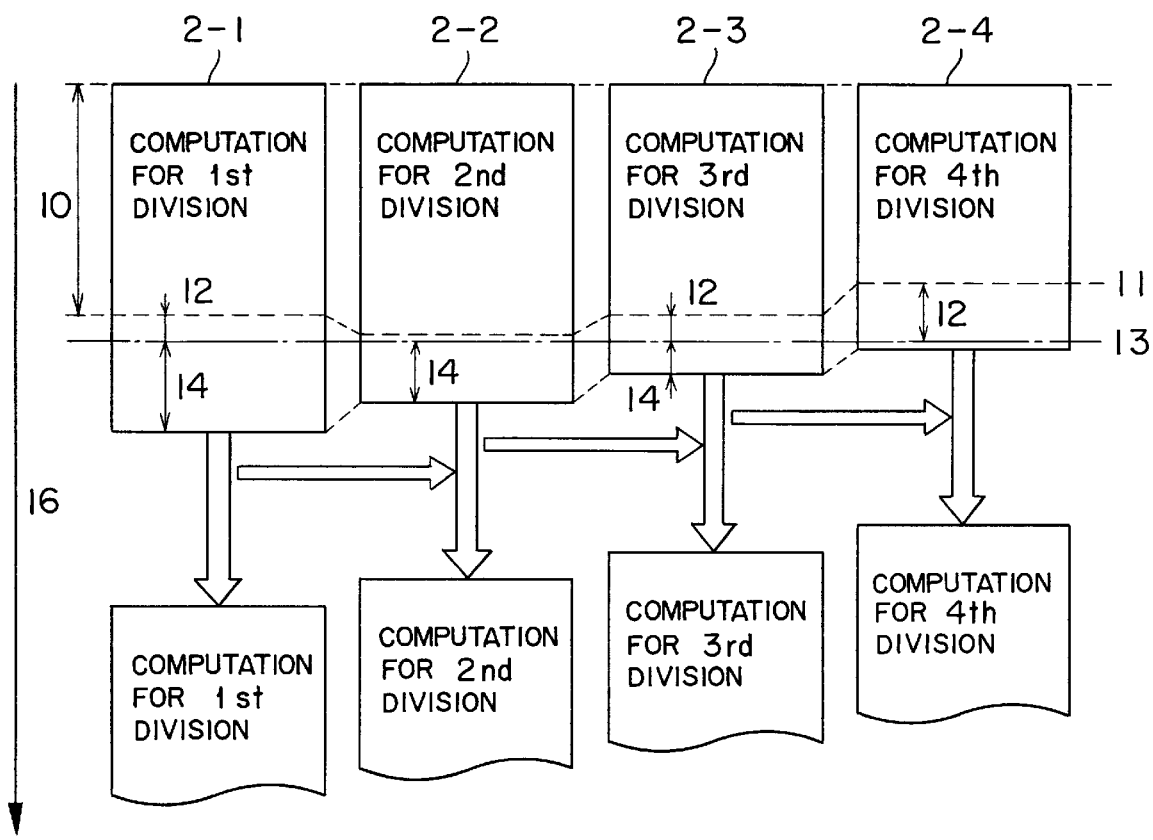
F I G. 10

PARALLEL COMPUTER SYSTEM AND METHOD OF COMMUNICATION BETWEEN THE PROCESSORS OF THE PARALLEL COMPUTER SYSTEM

BACKGROUND OF THE INVENTION

1. Field of the Invention

The present invention relates to a parallel computer system capable of providing integral data on large-scale facilities by analyzing the condition of the large-scale facilities through the analytical operations of a plurality of processors, and collecting data obtained by the analytical operations of the processors in a host computer, and a method of communication between the processors of such a parallel computer system.

2. Description of the Related Art

A parallel computer system for parallel operations of a MIMD (multiple information multiple data stream) system having a plurality of processors each provided with a communication means and an individual storage device is one of parallel computer systems provided with a plurality of processors and capable of carrying out parallel analytical operations of data on large-scale facility.

When designing large-scale facilities including an atomic energy plant, very frequent large-scale computation, for example, for the estimation of the behavior of radioactive rays when designing a shielding structure and for the estimation and analysis of the performance of a reactor core when designing the reactor core are required. The computing speed of the parallel computer system must greatly be enhanced to meet such a computation requirement. Recently, there has been developed a parallel computer system comprising a plurality of processors each provided with a communication means and an individual storage device and capable of carrying out analytical operations at a high computing speed. This parallel computer system is able to carry out analytical operations at a very high computing speed at which a computer provided with only a single processor cannot operate.

When solving a problem to develop, for example, a differential equation for analyzing information about a space of a huge, complex construction by using a parallel computer system having a plurality of processors, the space is divided into a plurality of small divisions, and the processors are assigned to the divisions, respectively. Then, each processor needs to carry out only small-scale, simple operations. Conditions for continuity between the divisions can be taken into consideration by transferring boundary condition data from one to another of the processors. In a parallel computer system of the MIMD system, processors exchange data and, at the same time, the flow of operations of the processors of the parallel computer system is controlled.

Referring to FIG. 7 showing the configuration of a parallel computer system by way of example, the parallel computer system has one host computer 1 and eight processors 2-1 to 2-8. The host computer 1 is provided with a storage device 3 and a communication device 4. The processors 2-1 to 2-8 are provided with individual storage devices 5-1 to 5-8 and communication devices 6-1 to 6-8, respectively. The communication devices 4 and 6-1 to 6-8 are interconnected by a communication cable 7.

For example, input data on large-scale facilities or the like given to the host computer 1 is transmitted by the communication device 4 through the communication devices 6-1 to 6-8 to the processors 2-1 to 2-8. The processors 2-1 to 2-8 operate information about divisions of the facilities allocated thereto and, if necessary, the processors 2-1 to 2-8 exchange data with each other. Data obtained by the parallel analytical operations of the processors 2-1 to 2-8 are sent to and integrated into analytical data on the facilities by the host computer 1.

It is unusual that a plurality of processors are able to operate perfectly independently for parallel computation without communication between the processors. Usually, the processors exchange a large amount of data frequently during computation.

When the improvement of the accuracy of computation is necessary, for example, an object space or an object time of operation is divided into smaller meshes, which, however, is accompanied by increase in the amount of data to be exchanged between the processors. Although the computing speed of the parallel computer system can be enhanced by increasing the number of the processors, increase in the number of processors entails increase in the frequency of communication between the processors. In some cases, increase in the frequency of communication between the processors and in the amount of data resulting from the complication of problems to be solved by the parallel computer system is a significant impediment to the enhancement of the computing speed of parallel computation.

In some cases, each processor 2 needs to transfer data to the rest of the plurality of processors 2 to complete one step of computation. In such a case, a plurality of sets of one-to-one communication between the processors are carried out. For example, the processor 2-1 receives data obtained by analytical computation from the two processors 2-2 and 2-3 by the following steps.

Step 1

Operation for data transfer from the processor 2-2 to the processor 2-1

Step 2

Operation for data transfer from the processor 2-3 to the processor 2-1

The processor 2-2 must complete computation before the processor 2-3 to carry out those operations sequentially. Generally, it is impossible to estimate the time computation is to be completed and it is possible that the processor which receives data completes computation before the processor which sends data. Therefore, data is transferred in the following manner to avoid confusion.

Step 1

Operation for data transfer from the processor 2-2 to the processor 2-3

Step 2

Operation for data transfer from the processor 2-3 to the processor 2-1

Data is transferred from the processor 2-2 to the processor 2-3 after the processor 2-2 has completed computation in step 1, and the processor 2-3 transfers the data received from the processor 2-2 together with data produced by the processor 2-3 to the processor 2-1 in step 2. Although the confusion of operations for sending out and receiving data can be avoided if data is transferred as mentioned above, the data produced by the processor 2-2 requires additional communication steps.

In parallel computing utilizing pipeline control, the data obtained by the analytical operation of a processor 2-n is used as an initial condition for the analysis by an adjacent processor 2-(n+1). For example, when solving a problem of heat transfer from a fluid flowing through a passage, the passage is divided into a plurality of divisions, the divisions are allocated to a plurality of processors 2 to solve problems of heat transfer in the divisions 1, 2, . . . respectively by the processors. Since the condition of the fluid at the exit of a division n is the condition of the fluid at the entrance of a division n+1, the data obtained by the analytical operation of the processor 2-n must be transferred from the processor 2-n to the processor 2-(n+1).

The data obtained through the analysis of a boundary condition, such as a temperature distribution or a flow velocity distribution, can be transferred from the upper stream processor to the lower stream processor in a cascaded mode, such as from the processor 2-1 to the processor 2-2, and then from the processor 2-2 to the processor 2-3 as shown in FIG. 8. In FIG. 8, parenthesized numerals indicate data receiving order.

When the data obtained through analysis is transferred in the cascaded mode, data obtained through the analytical operation of one processor and data received by the same processor from another processor must be stored in different memory cell arrays, respectively, even if those data are the same in physical category. Therefore, each processor is provided with a memory cell array for storing received data to prevent the destruction of the data obtained by the operation thereof. For example, a temperature distribution (i, j) received from the adjacent processor 2-(n−1) is stored temporarily in a buffer B(i, j), and the contents of the buffer B(i, j) is transferred to the temperature distribution (i, j) for calculation after sending out the temperature distribution (i, j) obtained by the processor 2-n to the adjacent processor 2-(n+1).

If data is transferred and stored by this data storage method, additional computational procedures (procedures for transferring data from a buffer array) increases with the increase of the amount of data and hence additional storage devices for storing received data are necessary.

SUMMARY OF THE INVENTION

Accordingly, it is an object of the present invention to provide a parallel computer system capable of limiting the amount of data to be transferred and operations necessary for transferring data to the least possible extent and of efficiently and rapidly carrying out parallel operations.

Another object of the present invention is to provide a communication method of communication between processors included in such a parallel computer system.

According to a first and a sixth aspect of the present invention, a parallel computer system which, when obtaining data on the entire space of large-scale facilities by carrying out analytical operations for analyzing the condition of the space sequentially from the condition of the uppermost stream position which gives an initial condition of the facilities in the facilities through conditions of lower stream positions toward the condition of the lowermost stream position, divides the entire space into a plurality of small divisions, assigns a plurality of processors thereof to the divisions, respectively, the lower stream processors assigned to lower stream divisions receiving data on a boundary condition from the upper stream processor assigned to upper stream divisions to determine a condition for the continuity of the adjacent divisions, the processors carrying out parallel analytical operations for the analysis of the data on the corresponding divisions so as to meet the received boundary condition; and collects data obtained by the parallel analytical operations of the processors in a host computer to obtain analytical data on the large-scale facilities. The lower stream processors assigned to the lower stream divisions receive boundary conditions provided by the upper stream processors assigned to the upper stream divisions in order starting from the lowermost stream processor assigned to the lowermost steam division upward, and the processor to receive data gives a data transmission request signal to the processor to transmit data, and the latter processor transmits data to the former processor after receiving the data transmission request signal given thereto by the former processor.

In the parallel computer system according to the first and the sixth aspect of the present invention, during the process of parallel computation in which results of computation stored in memory cell arrays of the processors are transferred sequentially from the upper stream processors to the lower stream processors, for example, from the processor 2-1 to the processor 2-2 and from the processor 2-2 to the processor 2-3, first, the processor 2-n transmits results of computation to the processor 2-(n+1), and then the processor 2-(n−1) transmits results of computation to the processor 2-n. When results of computation are thus transmitted, data to be transmitted and data to be received can be stored in the same memory cell array.

When transmitting data from the processor 2-n to the processor 2-m, the processor 2-m sends a data transmission request signal requesting data to the processor 2-n, the processor 2-n transmits data to the processor 2-m after receiving the data transmission request signal.

According to a second and a seventh aspect of the present invention, in the parallel computer system according to the first aspect of the present invention, the host computer sends data transmission request signals sequentially to the plurality of processors 2-n (n=1, 2, 3, . . . ) in predetermined order, and then the plurality of processors execute a data transmitting procedure for transmitting data to the host computer sequentially. Thus, the data can be transmitted from the plurality of processors to the host computer without confusion.

According to a third and a eighth aspect of the present invention, in the parallel computer system according to the first aspect of the present invention, the host computer, when receiving data from the processors, gives a data transmission request signal to predetermined one of the processors, the predetermined processor transmits data to the host computer upon the reception of the data transmission request signal, and gives a data transmission request signal to another predetermined processor, the processors which have sequentially received the data transmission request signal transmit data sequentially to the host computer and give a data transmission request signal to the processors which have not transmitted data to the host computer.

The parallel computer system according to the third and the eighth aspect of the present invention the plurality of processors transmit data to the host computer sequentially after the processor 2-n has received a data transmission request signal from the processor 2-(n−1) (n=1, 2, 3, . . . ) in order predetermined by the host computer, and then gives a data transmission request signal to the processor 2-(n+1). Thus, data provided by the plurality of processors are collected in the host computer.

According to a fourth and an ninth aspect of the present invention, in the parallel computer system according to the first aspect of the present invention, when each processor receives data from the rest of the processors, the former processor gives a data transmission request signal in predetermined order to the rest of the processors, and then the rest of the processors transmit data after receiving the data transmission request signal.

According to the fourth and the ninth aspect of the present invention, when the processor 2-m desires to receive data from the processors 2-n (n=1, 2, 3, . . . ), the processor 2-m sends a data transmission request signal in predetermined order to the processors 2-n, and then the processors 2-n transmit data sequentially to the processor 2-m to collect data in the processor 2-m.

According to a fifth and a tenth aspect of the present invention, in the parallel computer system according to the first aspect of the present invention, when the processor desires to receive data from the rest of the processors, the processor to receive data gives a data transmission request signal to predetermined one of the rest of the processors, the predetermined processor transmits data to the processor to receive data and gives a data transmission request signal to another predetermined one of the rest of the processors, and the rest of the processors transmit data sequentially to the processor to receive data upon the reception of the data transmission request signal and give a data transmission request signal to the rest of the processors which have not completed data transmission.

According to the fifth and the tenth aspect of the present invention, when the processors 2-n transmit data to the processor 2-m, the processors 2-n (n=1, 2, 3, . . . )transmit data sequentially to the processor 2-m after receiving a data transmission request signal from the processor 2-m, and give a data transmission request signal to the processor 2-(n+1). Thus, data provided by the processors 2-n are collected in the processor 2-m.

BRIEF DESCRIPTION OF THE DRAWINGS

The above and other objects, features and advantages of the present invention will become more apparent from the following description taken in connection with the accompanying drawings, in which:

FIG. 3 is a block diagram showing the configuration of a second embodiment according to the present invention;

FIG. 4 is a block diagram showing the configuration of a third embodiment according to the present invention;

FIG. 10 is a diagrammatic view of assistance in explaining a computation procedure utilizing pipeline control to be carried out by a conventional parallel computer system using a synchronizing signal.

DETAILED DESCRIPTION OF THE PREFERRED EMBODIMENTS

Figure 1:
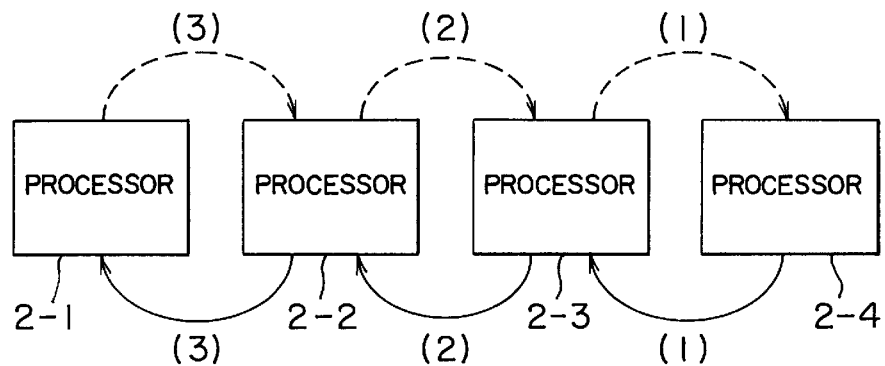
FIG. 1 is a block diagram showing the configuration of a first embodiment according to the present invention.

Referring to FIG. 1, in a parallel computer system in a first embodiment according to the present invention having a plurality of processors respectively assigned to divisions of a space, the processors assigned to lower stream divisions (referred to as "lower processors") receive a boundary condition from the processors assigned to upper stream divisions (referred to as "upper processors") sequentially, starting from the processor assigned to the lowermost stream division (referred to as "lowermost processor") upward. In FIG. 1 dotted lines indicate the flow of data, continuous lines indicate data transmission request signals, and parenthesized numerals indicate order in which the processors receive data or a data transmission request signal.

The first embodiment will be described as applied to the analysis of heat transfer of a fluid in a flow passage by a pipeline control. The flow passage is divided into N divisions corresponding to the number N of the processors, and the processors are assigned to the divisions, respectively. The divisions 1, 2, 3, . . . and N are arranged in that order from the inlet of the flow passage downward, and the processors 2-1, 2-2, 2-3, . . . and 2-N correspond to the divisions 1, 2, 3, . . . and N, respectively. A computation procedure comprises the following steps.

Step 1

All the processors compute simultaneously the variations of the condition (temperature, enthalpy or the like) of the fluid along the flow in the divisions.

Step 2

The processors transfer boundary conditions. Calculated data on the condition of the fluid at the outlet of the mth division ($1 \leq m \leq N$) is data on the condition of the fluid at the inlet of the (m+1)th division, i.e., an initial condition for the next step. In this embodiment, the processors 2-m transmit data to the processors 2-(m+1) sequentially.

Step 3

All the processors carries out operations for heat transfer analysis using boundary conditions received from the preceding processors as initial values, respectively.

A conventional method carries out the following procedure for data transmitting operations in step 2. The processor 2-1 assigned to the uppermost stream division (referred to as "uppermost processor") sends calculated data, such as temperature distribution data stored in a memory cell array X(I), to the processor 2-2 on the directly lower side of the processor 2-1. At this stage, calculated data provided by the processor 2-2 is stored in the memory cell array X(I) and hence the memory cell array X(I) cannot store received data. Therefore, the processor 2-2 receives the calculated data from the processor 2-1 by a buffer array B(I). The contents of the buffer array B(I) is transferred to the memory cell array X(I) after transmitting the data stored in the memory cell array X(I) to the directly lower processor 2-3.

Figure 8:
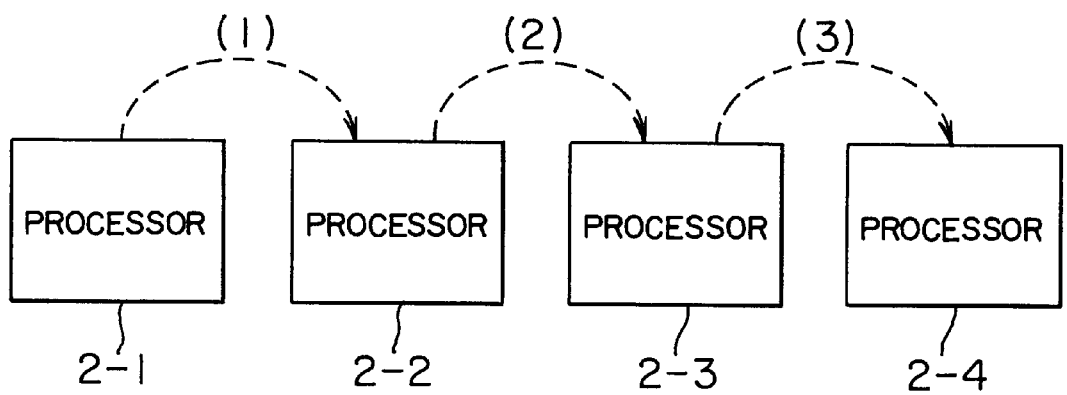
FIG. 8 is a block diagram showing the configuration of a conventional parallel computer system.

As shown in FIG. 8, the processors 2-1, 2-2 and 2-3 executes the procedure sequentially in that order to complete operations for step 2. This conventional method has two disadvantages that each processor needs the buffer array B(I), and each processor needs to carry out an operation to transfer the data from the buffer array B(I) to the memory cell array X(I).

In the first embodiment of the present invention, the data transfer operation is started from the lowermost processor N. First, the processor N-1 sends calculated data to the processor N, and then the processor N-1 receives calculated data from the directly upper processor N-2. If the parallel computer system is provided with the four processors as shown in FIG. 1, first, the processor 2-3 sends calculated data to the lowermost processor 2-4, the processor 2-3 receives calculated data from the directly upper processor 2-2, and, finally, the processor 2-2 receives calculated data from the directly upper processor 2-1.

Since the processor N–1 receives calculated data after the calculated data calculated by the processor N–1 has been transmitted to the processor N, the processor N–1 is able to use the memory cell array X(I) for receiving calculated data. If the data receiving operations of the processors are carried out sequentially starting from the lowermost processor upward, the buffer array B(I) is unnecessary and hence the operation for transferring data from the buffer array B(I) to the memory cell array X(I) is unnecessary.

In the first embodiment, when each processor transmits data to another processor, the processor to receive data transmits a data transmission request signal to the processor to transmit data, and the processor to transmit data transmits data after receiving the data transmission request signal.

The first embodiment is intended to avoid the confusion of communication which may occur in the conventional method of parallel computation in which, for example, the processor 2-m transmits data to the processor 2-(m+1), by sending a data transmission request signal from the processor 2-(m+1) to the processor 2-m before receiving data. In most cases, the processors are programmed for the same operations for parallel computation. Therefore, it is possible that the processor 2-(m+1) is in a state to send data to the processor 2-(m+2) when the processor 2-m is in a state to send data to the processor 2-(m+1). Although data can smoothly be transmitted if the processor 2-(m+1) completes computation before the processor 2-m, communication conflict occurs in the reverse case.

Figure 9:
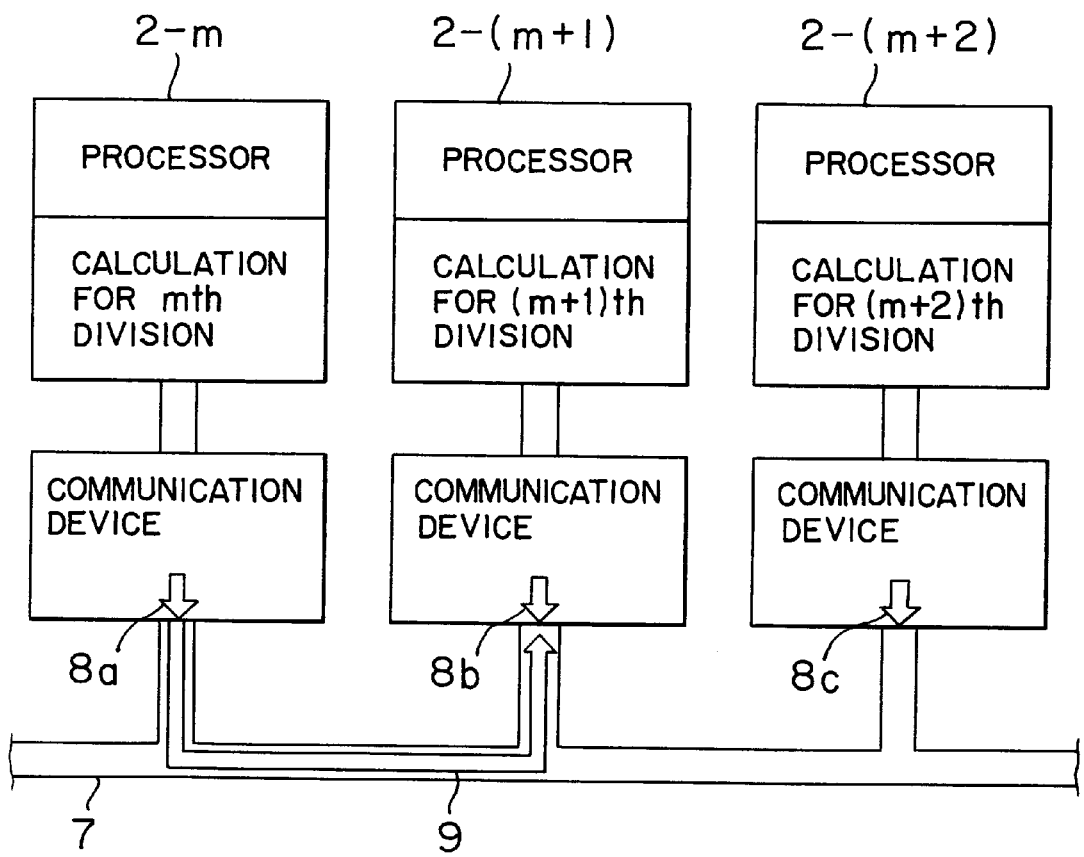
FIG. 9 is a diagrammatic view of assistance in explaining communication conflict which occurs during simple data transfer from one to another of the processors of a conventional parallel computer system.

FIG. 9 illustrates communication conflict which occurs when data is transmitted from the processor 2-m to the processor 2-(m+1) by the conventional method of data transmitting operation. The processor 2-m has started a data transmitting operation 8a before the processor 2-(m+1) starts a data transmitting operation 8b, and the processor 2-(m+1) is in a state in which the processor 2-(m+1) must receive a data transmission request signal 9. Under such circumstances, a transmitting operation and a receiving operation conflict with each other and the processor 2-m is in a state in which neither transmission nor reception is impossible. To avoid such communication conflict, the program must be designed so that the processor 2-(m+1) estimates the time when data sent out by the processor 2-m arrives at the processor 2-(m+1) and data can be transferred without confusion. However, the estimation of the time, practically, is almost impossible.

Therefore, in the first embodiment, the processor 2-(m+1) specifies the time to receive data by a data transmission request signal. If the processor 2-m has completed computation before the processor 2-(m+1) sends out the data transmission request signal, i.e., if the processor 2-m is in a standby mode and waiting for a data transmission request signal, the processor 2-m executes a data transmitting operation upon the reception of the data transmission request signal from the processor 2-(m+1). If the processor 2-m has not completed computation before the processor 2-(m+1) sends out the data transmission request signal, the processor 2-(m+1) remains in a standby mode after transmitting the data transmission request signal until the processor 2-m completes computation and transmits calculated data. Thus, communication conflict can be avoided by making the processor to receive data transmit data transmission request signal.

The first embodiment will be described as applied to the heat transfer analysis utilizing pipeline control. In the analysis, all the processors 2 carries out analytical operations simultaneously to analyze the divisions to which they are assigned. If the processors 2 complete computation sequentially from the lowermost processor 2 upward, the general computational operation can smoothly be achieved because data transfer in the next step can sequentially be carried out starting from the lowermost processor 2 upward.

Practically, order in which the processors 2 complete their analytical operations is indefinite. Suppose that the processor 2-m ($1 \leq m \leq N$) is the first to complete the analytical operation. The processor 2-m try to send data obtained by its analytical operation to the processor 2-(m+1). However, since the processor 2-(m+1) is still in the analytical operation, the processor 2-m remains in a standby mode and waits to transmit the data obtained by its analytical operation. Sooner or later, the processor 2-(m+1) completes the analytical operation and tries to send data obtained by its analytical operation to the processor 2-(m+2). However, what is required of the processor 2-(m+1) by the parallel computer system is the reception of the data obtained by an analytical operation and is not the transmission of the data obtained by an analytical operation.

Consequently, the processor 2-(m+1) become neither able to receive data nor able to transmit data, and stops functioning. Meanwhile, the processor 2-(m–1) directly on the upper side of the processor 2-m completes computation and tries to transmit the data obtained by an analytical operation to the processor 2-m. However, since the processor 2-m is in a wait-to-transmit state, the processor 2-(m–1) is unable to transmit the data obtained by its analytical operation. Thus, communication abnormality propagates from processor to processor across the entire parallel computer system and, eventually, the parallel computer system enters a stopped state for an indefinite period.

A method of preventing such a state synchronizes the operations of the processors and adjust the times of operations of the processors. If appropriate delay times are set for the processors 2, respectively, as shown in FIG. 10, communication conflict can be avoided. Although computation completion times 11 at which the processors 2 complete their computation, respectively, are different from each other as shown in FIG. 10, a synchronizing signal 13 is generated at the last computation completion time 11, and then the processors 2 perform data transmitting operations 15 sequentially, starting from the uppermost processor 2 downward.

Then, as shown in FIG. 10, the processing time of each of the processors 2 is equal to the sum of a computation time 10, a wait time 12 between a moment when the processor completes computation and a moment when the synchronizing signal 13 is generated, and a wait time 14 between the moment when the synchronizing signal 13 is generated and a moment when the processor 2 starts a data transmitting operation. In FIG. 10, indicated at 16 is a direction in which time is measured. When the operations of the processors 2 are thus synchronized, the parallel computer system is held in a standby mode until all the processors 2 complete computation and, consequently, an extra communication delay occurs and computation speed is reduced.

Figure 2:
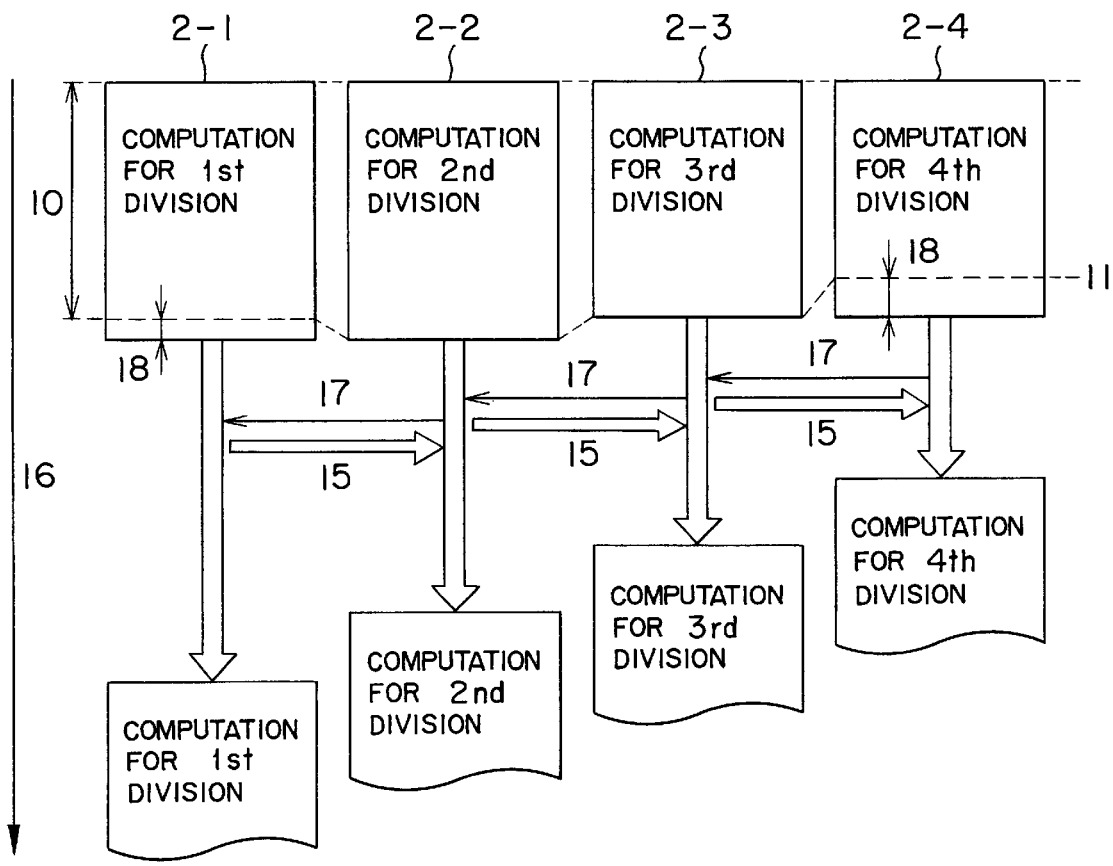
FIG. 2 is a diagrammatic view of assistance in explaining a computation procedure utilizing pipeline control to be carried out by the first embodiment.

In the first embodiment, each of the processors 2 transmits data upon the reception of a data transmission request signal 17 as shown in FIG. 2, and, if the processor has not completed computation by the time the data transmission request signal 17 is received, the processor transmits data after completing computation. Therefore, the processing time of each of the processors is equal to the sum of a computation time 10 and a wait time 18 between time when computation is completed and time when data is transmitted. Thus, the overall processing time is curtailed.

Operations of the processor 2-m will be explained by way of example.

Step 1

The processor 2-m completes computation.

Step 2

The processor 2-m receives a data transmission request signal 17 from the processor 2-(m+1) on the directly lower side thereof.

Step 3

The processor 2-m transmits data to the processor 2-(m+1) on the directly lower side thereof.

Step 4

The processor 2-m transmits a data transmission request signal to the processor 2-(m−1) on the directly upper side thereof.

Step 5

The processor 2-m receives data from the processor 2-(m−1) on the directly upper side thereof.

Step 6

The processor 2-m starts the next computation step.

The lowermost processor N skips steps 2 and 3; that is, the processor N starts a series of operations from the data transmission request signal transmitting operation of step 4, and the rest of the processors starts a series of operations from the data transmission request signal receiving operation of step 2. The transmission operation of the processor N is a trigger to start the series of operations, and the processors carry out sequentially data transmitting operations for transmitting data to the lower processors, starting from the processor N−1 upward, so that communication confusion is avoided. The extra communication delay attributable to the synchronization of the operations of the processors as shown in FIG. 10 is reduced.

FIG. 3 shows the configuration of a parallel computer system in a second embodiment according to the present invention. In the second embodiment, a host computer 1 sends data transmission request signals sequentially to processors 2 in predetermined order to receive data from the processors 2. The processors 2 transmit data after receiving the data transmission request signal. In FIG. 3, dotted lines indicate the flow of data, continuous lines indicate data transmission request signals, and parenthesized numerals indicate order in which the processors 2 receive data or a data transmission request signal.

Generally, the parallel computer system needs to carry out operations to send data from the host computer 1 to the plurality of processors 2, to make the processors 2 carry out computation in parallel, and to collect data obtained by the analytical operations of the processors in the host computer 1 after the processors have completed computation.

Suppose, by way of example, that a program is designed to make the host computer 1 receive data obtained by analysis from the processors 2-1, 2-2, 2-3 and 2-4 in that order and store the data obtained by analysis in a specified memory cell array. Since the processors 2 do not necessarily complete computation in the foregoing order in which the host computer 1 receives data obtained by analysis from the processors 2, a conventional method carries out the following data transmitting procedure to avoid communication confusion.

Step 1

The processor 2-4 transmits results of analysis to the processor 2-3.

Step 2

The processor 2-3 transmits data obtained by the analytical operations of the processors 2-3 and 2-4 to the processor 2-2.

Step 3

The processor 2-2 transmits data obtained by the analytical operations of the processors 2-2, 2-3 and 2-4 to the processor 2-1.

Step 4

The processor 2-1 transmits data obtained by the analytical operations of the processors 2-1, 2-2, 2-3 and 2-4 to the host computer 1.

If the data obtained by the analytical operations of the processors 2 are transmitted to the host computer 1 by the foregoing conventional method, a communication operation must be repeated as many as four times to send the data provided by the processor 2-4 to the host computer 1. Therefore, if the number of the processors 2 is increased, communication delay attributable to wasteful operations increases inevitably in proportion to the square of the number of the processors 2.

In a parallel computer system in a second embodiment according to the present invention, the transmission of a data transmission request signal from a host computer 1 to processors 2 in predetermined sequence and the reception of data by the host computer 1 from the processors 2 are carried out alternately to collect all the data provided by the processors 2 in the host computer 1 in the least possible communication time without entailing communication confusion. In the second embodiment, sequence in which data is received from the processors 2 may be changed according to condition.

The parallel computer system in the third embodiment will be described hereinafter. FIG. 4 shows the configuration of the parallel computer system in the fourth embodiment. When the host computer 1 receives data from the processors 2, the processors 2-i which have sequentially received a data transmission request signal transmit data to the host computer 1 and give a data transmission request signal to the processors 2-(i+1) which have not yet completed data transmission, respectively. In FIG. 4, dotted lines indicate the flow of data, continuous lines indicate data transmission request signals, and parenthesized numerals indicate order in which the processors 2 receive data or a data transmission request signal. When receiving data from the processors 2, the host computer 1 gives a data transmission request signal to predetermined one of the processors 2, for example the processor 2-1. Then, the processor 2-1 transmits data to the host computer 1 and, at the same time, gives a data transmission request signal to another predetermined one of the processors 2, for example, the processor 2-2. Upon the reception of the data transmission request signal, the processor 2-2 transmits data to the host computer 1 and, at the same time, gives a data transmission request signal to the processor 2-3 which has not yet transmitted data. Then, the processor 2-3 transmits data to the host computer 1 upon the reception of the data transmission request signal and, at the same time, gives a data transmission request signal to the processor 2-4 which has not yet transmitted data. Then, the lowermost processor 2-4 transmits data to the host computer 1.

Data obtained by computation by the processors 2-1, 2-2, 2-3 and 2-4 are collected in the host computer 1 by a data communication procedure including the following steps.

Step 1

The host computer 1 gives a data transmission request signal to the processor 2-1.

Step 2

The processor 2-1 transmits data to the host computer 1.

Step 3

The processor 2-1 gives a data transmission request signal to the processor 2-2.

Step 4

The processor 2-2 transmits data obtained by an analytical operation to the host computer 1.

Step 5

The processor 2-2 gives a data transmission request signal to the processor 2-3.

Step 6

The processor 2-3 transmits data obtained by an analytical operation to the host computer 1.

Step 7

The processor 2-3 gives a data transmission request signal to the processor 2-4.

Step 8

The processor 2-4 transmits data obtained by an analytical operation to the host computer 1.

Thus, the host computer 1 simply has to receive data from the processors 2-1, 2-2, 2-3 and 2-4 in that order. Accordingly, the third embodiment is more effective than the second embodiment shown in FIG. 4 in reducing communication time. However, the host computer 1 is allowed to receive data from the processors 2 in specific order of processors 2, and it is difficult to change the order according to condition. If order of the processors 2 in which the host computer 1 receive data from the processors 2 needs to be changed according to condition, the third embodiment shown in FIG. 3 is preferable.

Figure 5:
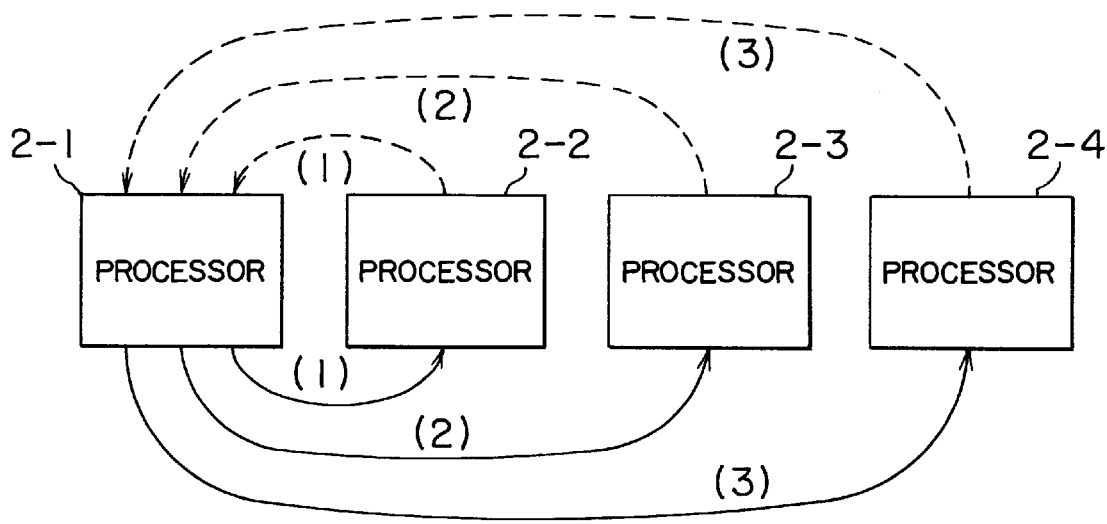
FIG. 5 is a block diagram showing the configuration of a fourth embodiment according to the present invention.

A parallel computer system in a fourth embodiment according to the present invention will be described hereinafter with reference to FIG. 5 showing the configuration of the parallel computer system in the fourth embodiment. In the parallel computer system in the fourth embodiment, the method of data transfer between the host computer 1 and the plurality of processors 2, employed in the second embodiment is applied to data transfer between one of the processors and the rest of the processors.

In FIG. 5, dotted lines indicate the flow of data, continuous lines indicate data transmission request signals, and parenthesized numerals indicate order in which the processors 2 receive data or a data transmission request signal. When the processor 2-1 desires to receive data from the processors 2-2, 2-3 and 2-4, the processor 2-1 gives a data transmission request signal sequentially to the processors 2-2, 2-3 and 2-4 in predetermined order, and then the processors 2-2, 2-3 and 2-4 transmit data to the processor 2-1 after receiving the data transmission request signal. Thus, data provided by the processors 2-n are collected in the processor 2-m.

Figure 6:
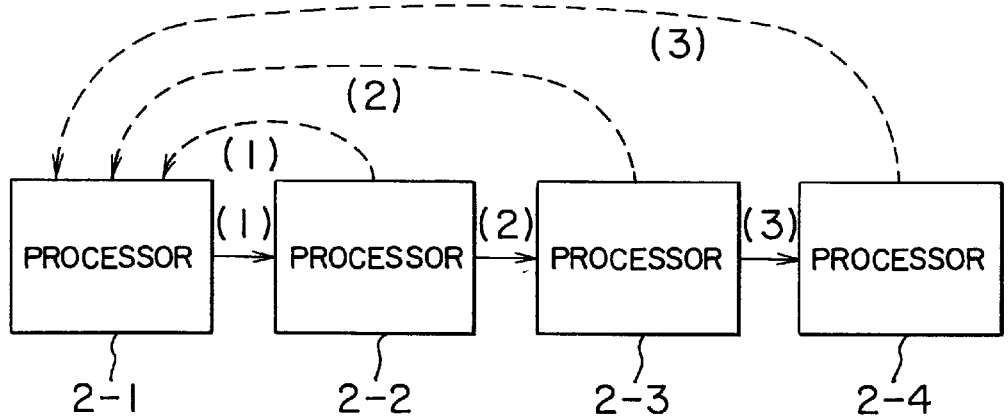
FIG. 6 is a block diagram showing the configuration of a fifth embodiment according to the present invention.
Figure 7:
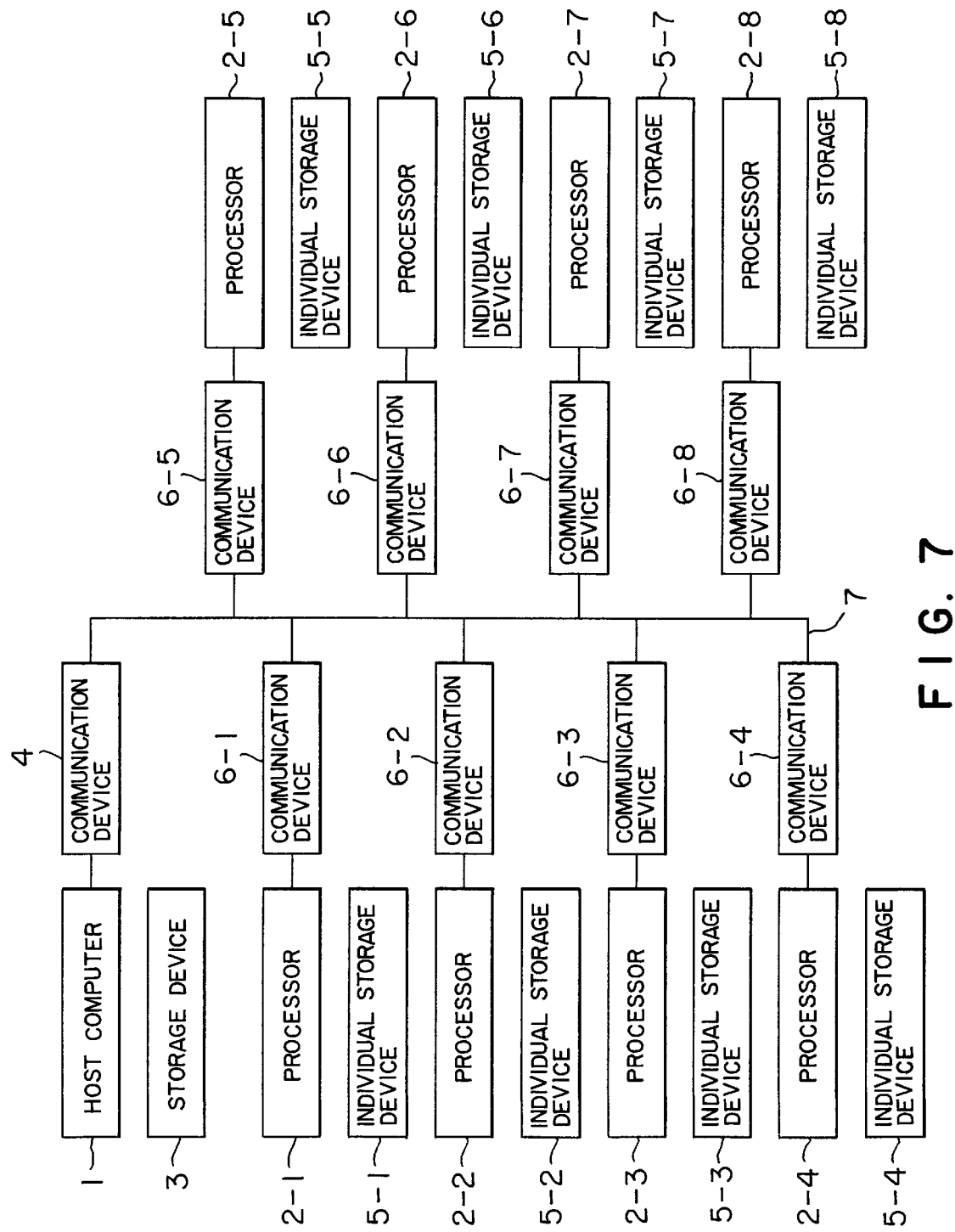
FIG. 7 is a block diagram of a parallel computer system comprising a host computer and a plurality of processors.

A parallel computer system in a fifth embodiment according to the present invention will be described hereinafter with reference to FIG. 6 showing the configuration of the parallel computer system in the fifth embodiment. In the parallel computer system in the fifth embodiment, the method of data transfer between a host computer 1 and a plurality of processors 2, employed in the third embodiment is applied to data transfer between one of the processors and the rest of the processors.

In FIG. 6, dotted lines indicate the flow of data, continuous lines indicate data transmission request signals, and parenthesized numerals indicate order in which the processors 2 receive data or a data transmission request signal. When the processor 2-1 desires to receive data from the processors 2-2, 2-3 and 2-4, the processor 2-1 gives a data transmission request signal to the processor 2-2. The processor 2-2 transmits data to the processor 2-1 upon the reception of the data transmission request signal and, at the same time, gives a data transmission request signal to the processor 2-3. The processor 2-3 transmits data to the processor 2-2 upon the reception of the data transmission request signal and, at the same time, gives a data transmission request signal to the processor 2-4 which has not yet transmitted data. Thus data obtained by the processors 2-2 to 2-4 are collected in the processor 2-1.

As is apparent from the foregoing description, in the parallel computer system in accordance with the present invention and the method of communication between the processors of the parallel computer system, the processors generates data transmission request signals which flow in a direction opposite the data transfer direction to avoid confusion in communication between the processors due to different computation completion times at which the processors complete computation, respectively, so that the data can flow along the predetermined transfer passage. Thus, the amount of data to be transferred and operations necessary for transferring the data can be reduced to the least possible extent by thus deciding the data transfer passage, and the speed and efficiency of parallel computing operations can be enhanced.

The parallel computer system in accordance with the present invention and the method of communication between the processors of the parallel computer system can be applicable not only to the computational analysis of large-scale facilities, but also to various information processing systems employing a plurality of processors which operate in parallel for information processing.

Although the invention has been described in its preferred form with a certain degree of particularity, obviously many changes and variations are possible therein. It is therefore to be understood that the present invention may be practiced otherwise than as specifically described herein without departing from the scope and spirit thereof

What is claimed is:

1. A parallel computer system comprising a system which, when obtaining data on the entire space of large-scale facilities by carrying out analytical operations for analyzing the condition of the entire space sequentially from the condition of the uppermost stream position which gives an initial condition of the facilities in the facilities through conditions of lower stream positions toward the condition of the lowermost stream position, divides the entire space into a plurality of small divisions; assigns a plurality of processors thereof to the divisions, respectively, the lower stream processors assigned to lower stream divisions receiving data on a boundary condition from the upper stream processor assigned to upper stream divisions to determine a condition for the continuity of the adjacent divisions, the processors carrying out parallel analytical operations for the analysis of the data on the corresponding divisions so as to meet the received boundary condition; and collects data obtained by the parallel analytical operations of the processors in a host computer to obtain analytical data on the large-scale facilities;

wherein the lower stream processors assigned to the lower stream divisions receive boundary conditions provided by the upper stream processors assigned to the upper stream divisions in order starting from the lowermost stream processor assigned to the lowermost stream division upward; and the processor to receive data gives a data transmission request signal to the processor to transmit data, and the latter processor transmits data to the former processor after receiving the data transmission request signal given thereto by the former processor.

2. The parallel computer system according to claim 1, wherein the host computer, when receiving data from the processors, gives data transmission request signals sequentially to the processors in predetermined order, and then the processors transmit data to the host computer sequentially after receiving the data transmission request signal.

3. The parallel computer system according to claim 1, wherein, the host computer, when receiving data from the processors, gives a data transmission request signal to predetermined one of the processors, the predetermined processor transmits data to the host computer upon the reception of the data transmission request signal, and gives a data transmission request signal to another predetermined processor so that the processors which have sequentially received the data transmission request signal transmit data sequentially to the host computer and give a data transmission request signal to the processors which have not yet transmitted data to the host computer.

4. The parallel computer system according to claim 1, wherein specified one of the processors, when receiving data from the rest of the processors, gives data transmission request signals sequentially in predetermined order to the rest of the processors so that the rest of the processors transmit data sequentially to the specified processor upon the reception of the data transmission request signal.

5. The parallel computer system according to claim 1, wherein specified one of the processors, when receiving data from the rest of the processors, gives a data transmission request signal to predetermined one of the rest of the processors, the predetermined processor transmits data to the specified processor upon the reception of the data transmission request signal and gives a data transmission request signal to another predetermined one of the rest of the processors so that the rest of the processors transmit data to the specified processor upon the reception of data transmission request signal and give data transmission request signals sequentially to the rest of the processors which have not yet completed data transmission.

6. A method of communication between processors included in a parallel computer system comprising, when obtaining data on the entire space of large-scale facilities by carrying out analytical operations for analyzing the condition of the entire space sequentially from the condition of the uppermost stream position which gives an initial condition of the facilities in the facilities through conditions of lower stream positions toward the condition of the lowermost stream position, divides the entire space into a plurality of small divisions; assigns a plurality of processors thereof to the divisions, respectively, the lower stream processors assigned to lower stream divisions receiving data on a boundary condition from the upper stream processor assigned to upper stream divisions to determine a condition for the continuity of the adjacent divisions, the processors carrying out parallel analytical operations for the analysis of the data on the corresponding divisions so as to meet the received boundary condition; and collects data obtained by the parallel analytical operations of the processors in a host computer to obtain analytical data on the large-scale facilities;

wherein the lower steam processors assigned to the lower stream divisions receive boundary conditions provided by the upper stream processors assigned to the upper stream divisions sequentially in order starting from the lowermost steam processor assigned to the lowermost stream division upward; and the processor to receive data gives a data transmission request signal to the processor to transmit data, and the latter processor transmits data to the former processor after receiving the data transmission request signal given thereto by the former processor.

7. The method of communication between processors included in a parallel computer system, according to claim 6, wherein the host computer, when receiving data from the processors, gives data transmission request signals sequentially to the processors in predetermined order, and then the processors transmit data to the host computer sequentially after receiving the data transmission request signal.

8. The method of communication between processors included in a parallel computer system, according to claim 6, wherein the host computer, when receiving data from the processors, gives a data transmission request signal to predetermined one of the processors, the predetermined processor transmits data to the host computer upon the reception of the data transmission request signal, and gives a data transmission request signal to another predetermined processor so that the processors which have sequentially received the data transmission request signal transmit data sequentially to the host computer and give a data transmission request signal to the processors which have not yet transmitted data to the host computer.

9. The method of communication between processors included in a parallel computer system, according to claim 6, wherein specified one of the processors, when receiving data from the rest of the processors, gives data transmission request signals sequentially in predetermined order to the rest of the processors so that the rest of the processors transmit data sequentially to the specified processor upon the reception of the data transmission request signal.

10. The method of communication between processors included in a parallel computer system, according to claim 6, wherein specified one of the processors, when receiving data from the rest of the processors, gives a data transmission request signal to predetermined one of the rest of the processors, the predetermined processor transmits data to the specified processor upon the reception of the data transmission request signal and gives a data transmission request signal to another predetermined one of the rest of the processors so that the rest of the processors transmit data to the specified processor upon the reception of data transmission request signal and give data transmission request signals sequentially to the rest of the processors which have not yet completed data transmission.

* * * * *